No. 782,826. PATENTED FEB. 21, 1905.
W. B. CHURCHER.
ALTERNATING CURRENT RECTIFIER.
APPLICATION FILED SEPT. 3, 1904.

Witnesses
Levi H Goodwin
A. McCormack

Inventor
William B. Churcher
By C. W. Miles
Attorney

No. 782,826. Patented February 21, 1905.

UNITED STATES PATENT OFFICE.

WILLIAM B. CHURCHER, OF CINCINNATI, OHIO, ASSIGNOR TO KENNON DUNHAM, OF CINCINNATI, OHIO.

ALTERNATING-CURRENT RECTIFIER.

SPECIFICATION forming part of Letters Patent No. 782,826, dated February 21, 1905.

Application filed September 3, 1904. Serial No. 223,183.

*To all whom it may concern:*

Be it known that I, WILLIAM B. CHURCHER, a citizen of the United States, residing at Cincinnati, in the county of Hamilton and State of Ohio, have invented certain new and useful Improvements in Alternating-Current Rectifiers; and I do hereby declare the following to be a full, clear, and exact description of the invention, such as will enable others skilled in the art to which it appertains to make and use the same.

My invention relates to improvements in alternating-current rectifiers.

One of its objects is to provide improved means for cooling or maintaining an even temperature in the electrolyte of the rectifying-cells without liability of the current to pass from one cell to the other by means of the cooling medium, thereby preventing any of the cells from influencing or disturbing the action of the others.

It further consists in certain details of form, combination, and arrangement, all of which will be more fully set forth in the description of the accompanying drawings, in which—

Figure 1:
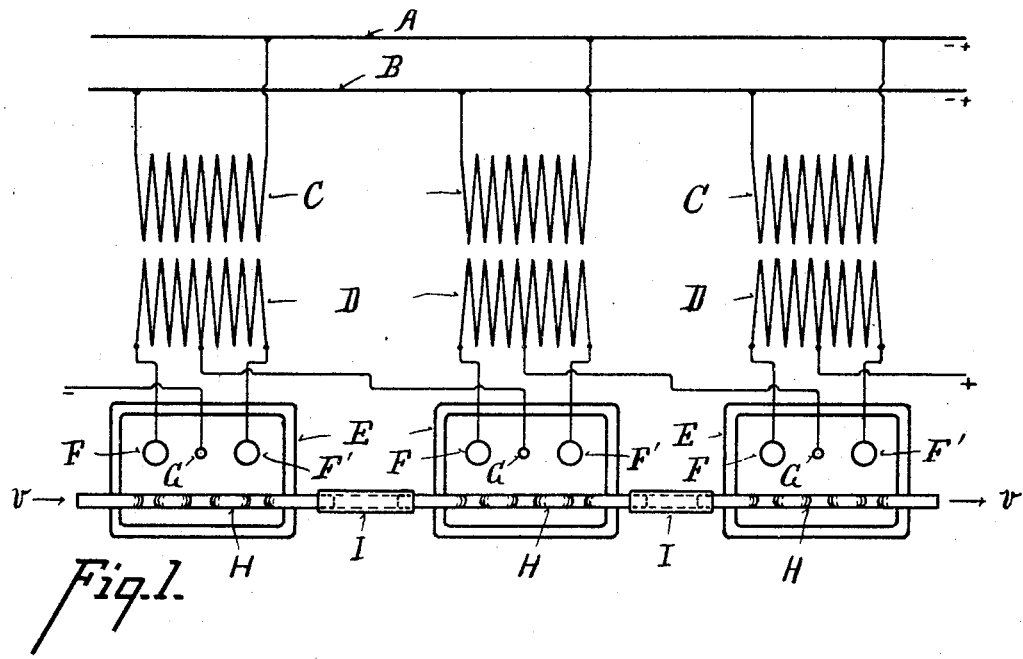
Figure 2:
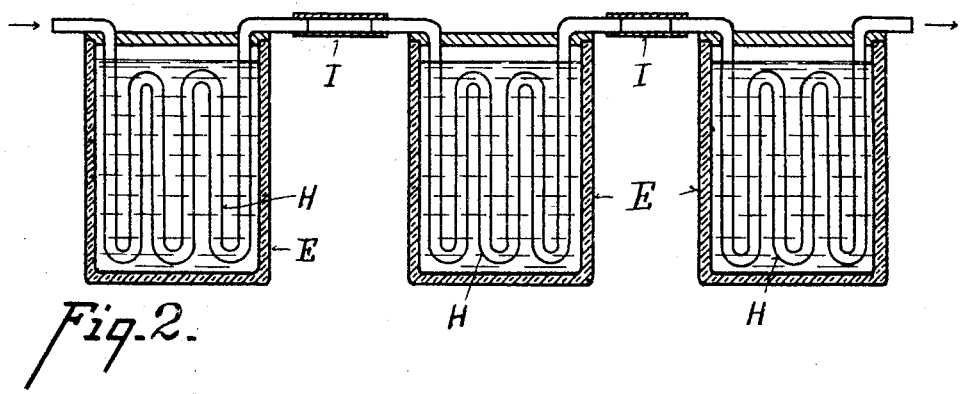

Figure 1 is a top plan view or diagram of my improved apparatus. Fig. 2 is a vertical section through the cells on line $v\ v$ of Fig. 1.

In the accompanying drawings, A B represent the alternating-current line-wires.

C represents primary coils in electrical connection with and receiving current from the line-wires. D represents secondary coils energized by the current in said primaries.

E represents electrolytic cells, in which are located electrodes F F', of aluminium, and an electrode G, of platinum, carbon, or other suitable material. The electrodes F F' are respectively connected to the opposite terminals of the secondary coils and the cells and secondaries connected in series by connections between intermediate points on the secondaries and the electrodes G. The connection of the cells and secondaries in series effects an increase in voltage of the rectified current over what could be attained with the use of one cell.

Where large volumes of current are to be rectified, the electrolyte is liable to become unduly heated, and it becomes necessary to cool the electrolyte in some manner. This I effect by employing coils of pipe H, composed of aluminium, which may be formed by casting, or constructed of drawn aluminium pipe, or in any desired manner. These coils are immersed in the electrolyte and preferably connected together by means of sections of rubber tube I in tandem series, so that a liquid-cooling medium may be conveniently circulated through the coils to extract the heat from the electrolyte. The action of the aluminium electrodes and the electrolyte in the respective cells is such that for low voltages, say less than seventy volts, the current will pass from the electrode G, acting as an anode, to one or other of the electrodes F F', acting as cathode; but practically no current will pass between electrodes F F' or between one of the electrodes F F', acting as anode, to electrode G, acting as cathode. For higher voltages, say above seventy volts, a current is liable to pass from one electrode F to the other and both to and from electrode G, or from one electrode F to the coil and thence to the opposite electrode F. Therefore for high voltages a series of cells are preferably joined in series. It will be noted that current is free to pass from electrode G of any cell not only to one of the electrodes F, but to the coil H, which, if of iron, copper, or other similar metal, would pass current through the cooling medium to the other cells, where the coil might act as anode to pass current to one of the electrodes F F', which would carry the metal of the coil into solution and contaminate and ruin the electrolyte, would divert the current from its proper path, and render the apparatus inoperative. By providing coils H of the same material as the electrodes F F' the tendency of the current to pass from one cell to the other is prevented, because even should the current pass from one coil to the other the action of the surface of the coils in contact with the electrolyte is similar to the action at the surface of the electrodes F F', and any current which might pass from one cell to the other by means of the cooling-coils could not enter the electrolyte of the cell in which the cooling-coil was acting as anode, and thus any disturbing influence from one cell is not transmitted to any of the others, while the cooling medium is free to pass through the coils and effect its purpose.

The mechanism herein specified is capable of considerable modification without departing from the principle of my invention.

Having described my invention, what I claim is—

1. In an alternating-current rectifier employing electrolytic cells with aluminium electrodes, means for cooling the electrolyte consisting of a fluid-cooling medium and aluminium conductors therefor immersed in the electrolyte of the cells.

2. In an alternating-current rectifier employing electrolytic cells with aluminium electrodes, aluminium conductors immersed in the electrolyte of the cells and forming a passage for a fluid-cooling medium.

3. In an alternating-current rectifier an electrolytic cell, an aluminium electrode, a medium for cooling the electrolyte and an aluminium wall interposed between the electrolyte and the cooling medium.

4. In an alternating-current rectifier, an electrolytic cell, a pair of electrodes, one of which is asymmetric in character, a circulating medium for cooling the electrolyte, and a wall of asymmetric conducting material interposed between the electrolyte and cooling medium.

In testimony whereof I have affixed my signature in the presence of two witnesses.

WILLIAM B. CHURCHER.

Witnesses:
C. W. MILES,
A. McCORMACK.